United States Patent [19]

Vandrish

[11] 4,426,214

[45] Jan. 17, 1984

[54] LAMINATED FILTERS

[75] Inventor: George Vandrish, Vanier, Canada

[73] Assignee: Pylon Electronic Development Company Ltd., Ontario, Canada

[21] Appl. No.: 354,400

[22] Filed: Mar. 3, 1982

[30] Foreign Application Priority Data

Mar. 26, 1981 [CA] Canada .................................. 373979

[51] Int. Cl.³ .......................................... B01D 46/10
[52] U.S. Cl. ........................................ 55/511; 55/270; 55/481; 55/DIG. 69; 55/DIG. 31; 73/863.23; 73/863.25; 73/28
[58] Field of Search ................ 55/270, 481, 490, 495, 55/501, 502, 503, 511, 529, DIG. 69, DIG. 31, 158, 514; 210/459; 73/28, 863.23, 863.25; 250/435

[56] References Cited

U.S. PATENT DOCUMENTS

| | | | |
|---|---|---|---|
| 1,020,782 | 3/1912 | Tinker | 55/503 |
| 3,342,729 | 9/1967 | Strand | 55/158 |
| 3,348,044 | 10/1967 | Sanders | 250/435 |
| 3,555,278 | 1/1971 | Schroeder | 250/304 |
| 3,654,801 | 4/1972 | Keefer et al. | 55/270 |
| 3,679,311 | 7/1972 | Vandusen, Jr. | 55/270 |
| 3,803,810 | 4/1974 | Rosenberg | 55/DIG. 31 |
| 4,174,205 | 11/1979 | Koushiafes | 55/501 |

FOREIGN PATENT DOCUMENTS 985337  3/1965  United Kingdom .................. 55/490

*Primary Examiner*—David L. Lacey
*Attorney, Agent, or Firm*—Charles W. Fallow; Martin P. Hoffman; Mitchell B. Wasson

[57] ABSTRACT

Disclosed are filters which are particularly useful in sampling devices for detecting radioactive particulate contaminants in a gaseous medium, such as air. The filters comprise a filter membrane sandwiched between two pieces of plastic material having holes exposing the filter membrane to the gaseous medium. The filters can readily be handled by grasping them by their plastic portions and there is little risk of the filter medium being damaged. An air tight seal may easily be made with the plastic surrounding the filter medium. The filter is easily constructed by placing a piece of filter material to cover a hole in a plastic base layer and then covering them both with a plastic cover layer having a hole to match the hole in the base layer. The cover layer is preferably formed of self-adhesive layer.

3 Claims, 4 Drawing Figures

LAMINATED FILTERS

BACKGROUND OF THE INVENTION

This invention relates to filters which, although not limited thereto, are particularly useful in sampling devices for detecting particulate contaminants in a gaseous medium, particularly radioactive contaminants.

Various filters are known in the prior art but have various disadvantages which are alleviated by the present invention.

U.S. Pat. No. 3,109,096 of Spaa issued Oct. 29, 1963, discloses a system for determining the radioactivity of gas sols (airborne particles and gaseous aerosols) which utilizes a continuous roll of filter paper. However, it is difficult to obtain a gas-tight seal with the filter paper at the detector station and the filter paper can be easily damaged. Rolls of filter paper are also somewhat awkward to handle.

U.S. Pat. No. 3,555,278 of Schroeder, issued Jan. 12, 1971, discloses apparatus for measuring potential alpha ray activity of a gas sample containing radon which produces daughter products, some of whom are alpha ray emitters. The apparatus uses filter paper which is held in place by tape or by clamping. It is inconvenient to handle the filter paper in this manner and, if care is not taken, it may easily be damaged.

U.S. Pat. No. 3,654,801 of Keefer et al, issued Apr. 11, 1972, also discloses apparatus using a continuous tape of filter material which passes from a supply roll to a take up roll. The disadvantages are the same as mentioned above in connection with U.S. Pat. No. 3,109,096. Similar comments apply to the arrangement disclosed in U.S. Pat. No. 4,144,454 of Groh et al, issued Mar. 13, 1979.

SUMMARY OF THE INVENTION

The present invention provides a filter which is particularly useful in a sampling device. The sampling device uses a filter comprising a filter membrane sandwiched between two pieces of plastic material having holes exposing the filter membrane to a gaseous medium, such as air. The filters, which somewhat resemble credit cards, although generally smaller, can readily be handled by grasping them by their plastic portions. In this manner, they may be easily picked up, inserted in the sampling apparatus and may be moved within the sampling apparatus with very little danger of damaging the filter material per se. Also, an air tight seal may easily be made with the plastic surrounding the filter medium so that radioactivity measurements may be readily made. A number of filters may be provided as a continuous roll with tear-strip perforations between adjacent filters and sprocket holes along the sides. By this means, the filters may be easily moved by a sprocket wheel to various positions within the measurement apparatus.

Filters of the type used in the present invention have other advantages as well, such as the following:
(a) Reusibility in the case of a decaying radioactive aerosol.
(b) Simplicity of storage for later reference.
(c) Use of very simple and reliable filter holders if one (thicker) piece of plastic includes a perforated screen for backing and reinforcement of the filter medium. (Known "Gelman" holders often crush the prior art type of filter during closing and one is never certain of a good seal. Leakage of air past the filter could cause erroneous results.)

According to a broad aspect of the invention, there is provided a filter for use in sampling devices for detecting particulate contaminants in a gaseous medium, comprising a base layer of opaque plastic material, said base layer having a hole of predetermined size; a filter membrane having a size slightly greater than said predetermined size and covering said hole; and a cover layer of plastic material adhered to said base layer, said cover layer having a hole of said predetermined size in registry with the hole in the base layer.

BRIEF DESCRIPTION OF THE DRAWING

The invention will now be further described in conjunction with the accompanying drawings, in which.

DESCRIPTION OF THE PREFERRED EMBODIMENTS

Figure 1:
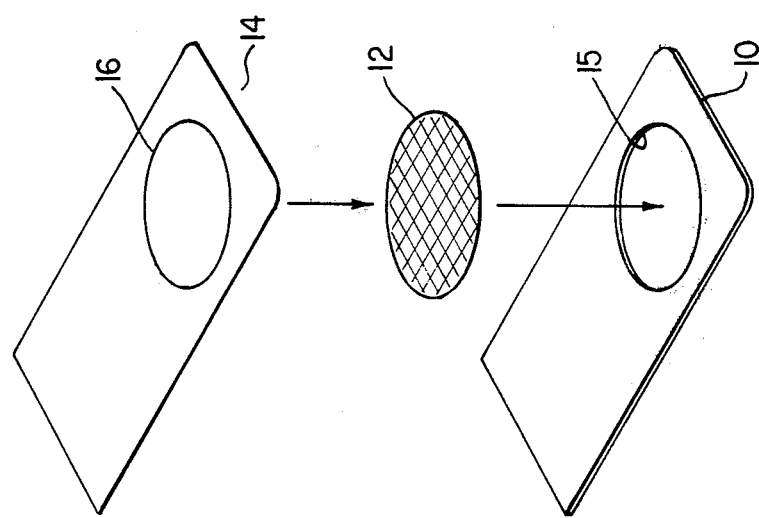
FIG. 1 is an exploded view of a filter according to the invention.

Referring to FIG. 1, a filter according to the present invention comprises a base layer 10 of plastic, a filter membrane 12 and a cover layer 14. The layers 10 and 14 have holes 15 and 16 of predetermined diameter and the filter membrane 12 has a diameter slightly greater than the diameter of the holes 15 and 16. In assembled condition, the edge of the membrane 12 is sandwiched between the base layer 14 and the cover layer 10 with both surfaces of the filter 12 being exposed through the holes 15 and 16 in the base layer 10 and cover layer 14. The cover 14 is adhered to the base layer 10. Preferably, the cover layer 14 is formed of self-adhesive vinyl so that the filter may be assembled by simply placing the filter medium 12 on the base member 10 and then pressing on the cover layer 14. After assembly, the filter can be handled by grasping the plastic portions with very little danger of physically damaging or contaminating the filter medium 12.

Figure 2:
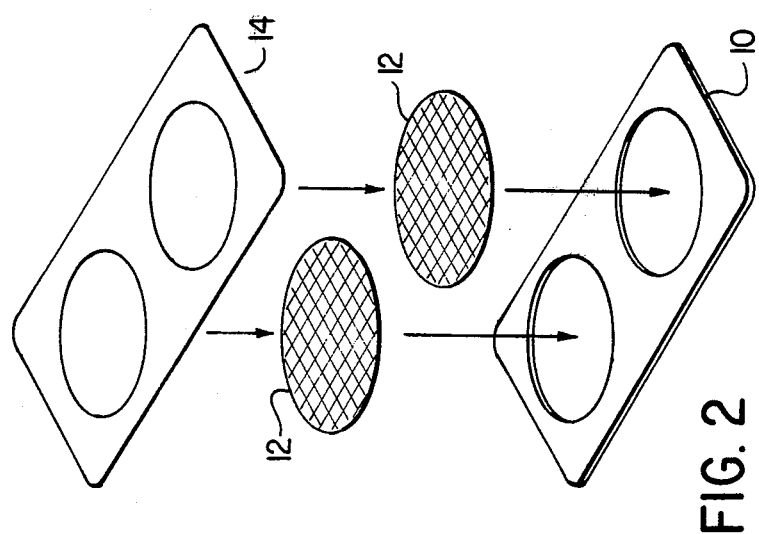
FIG. 2 is an exploded view of a filter provided with two filter discs.

FIG. 2 illustrates an alternative filter embodiment wherein the base and cover layers 10 and 14 have two holes and two filter discs 12 are provided. Otherwise, the structure is the same as in FIG. 1.

The base member 10 may be 0.010 to 0.25 mm thick opaque plastic, opaque plastic being preferred so that when the filter is used in a sampling device having a photodetector for detecting radioactive particles on the filter, ambient light will not be able to reach the detector. The filter may be 0.8 mm millipore material, glass fiber, or other suitable material. Layer 14 may be self-adhesive vinyl having a thickness of the order of 0.1 mm. The holes 15 and 16 may be, for example, 20 mm in diameter.

The thickness of the plastic layer 10 prevents rub off of filtered material during handling, or during movement of the filter from the sampling position to the measurement position within the sampling device. The recessed distance should, however, be kept small to maintain high counting efficiency and resolution at the detector (measuring) position. The dark plastic layer 10 should, however, be sufficiently thick to ensure rigidity and filter durability. The self-adhesive plastic layer 14, which may be transparent, laminates the filter to the dark plastic fronting material 10.

The dimensions given are, of course, merely exemplary and may be varied as desired, depending on the intended application. It is preferred that the layer 10 be opaque but this is not essential if the detector can provide a light-tight seal around the filter medium 12.

Figure 3:
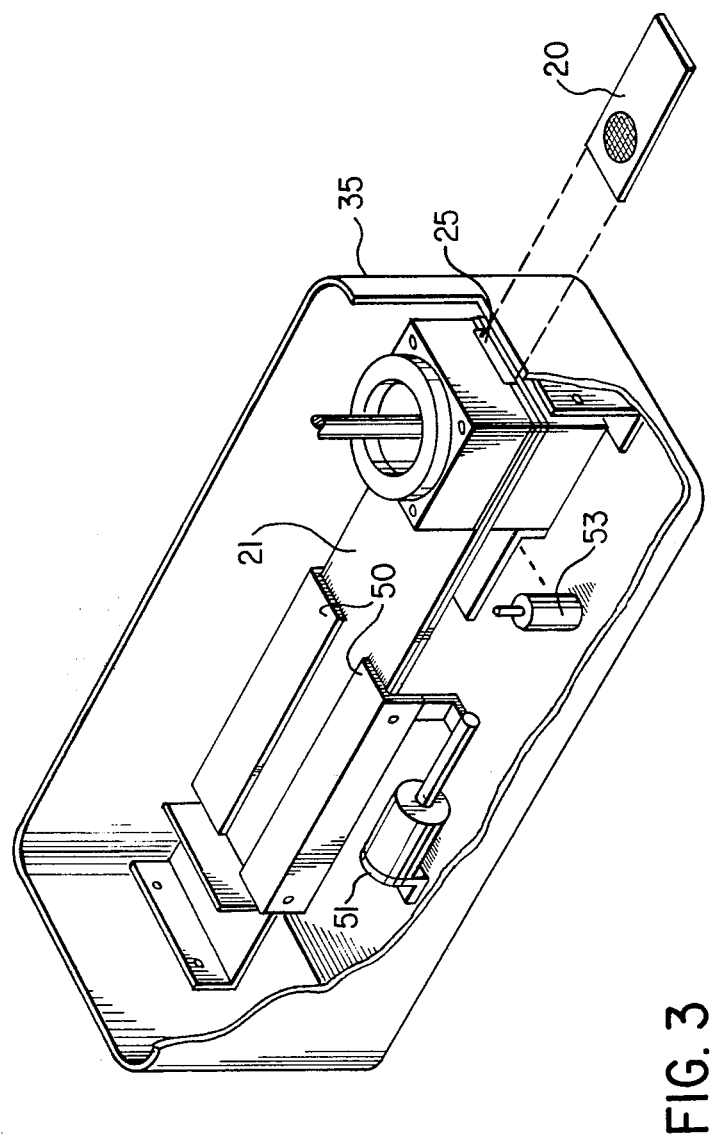
FIG. 3 is a pictorial view, partly cut away, of a sampling device in which a filter according to the invention may be used.
Figure 4:
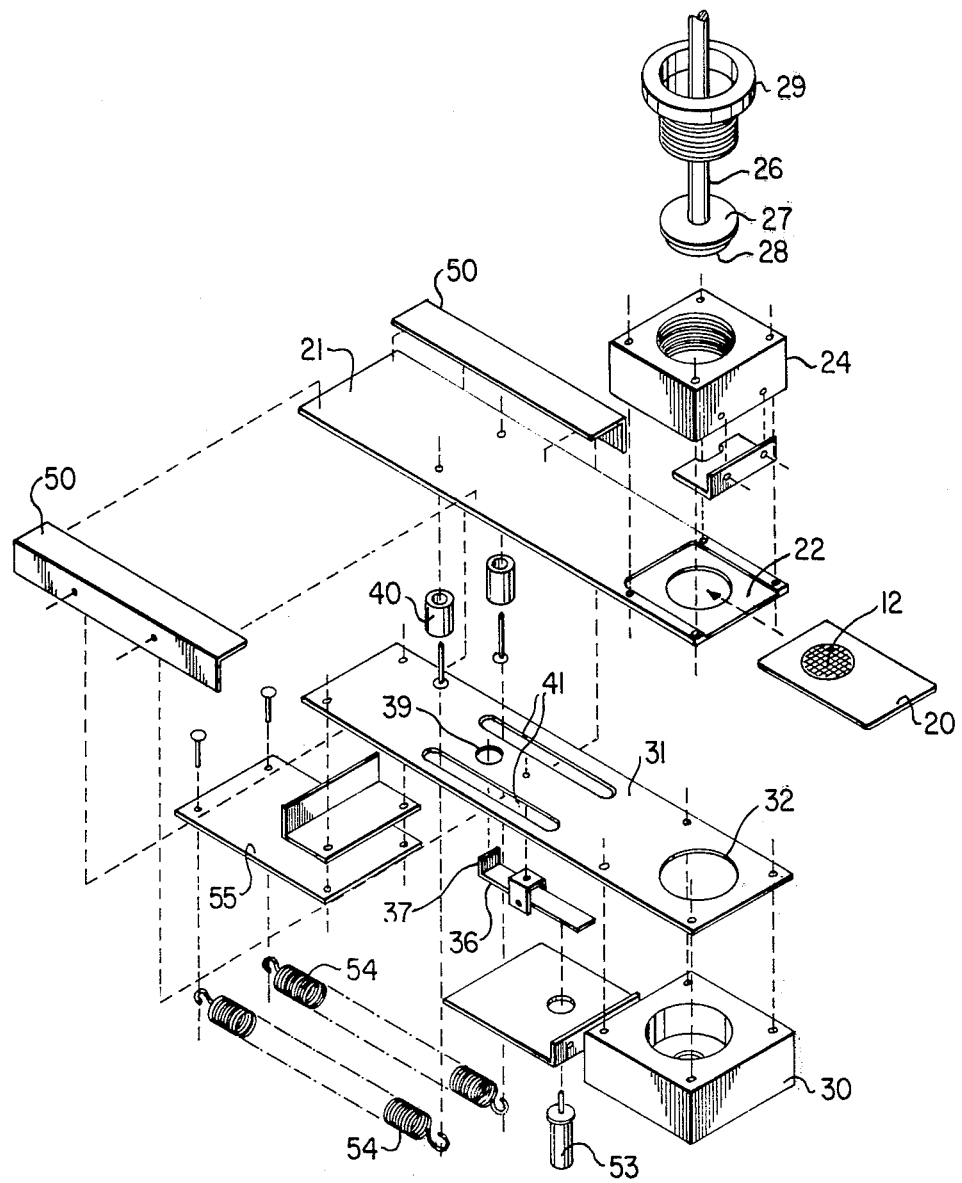
FIG. 4 is an exploded view of apparatus of the type shown in FIG. 3.

Referring to FIGS. 3 and 4, one embodiment of a sampling device in which a filter in accordance with the present invention may be used is illustrated. The device comprises a movable top plate 21 having a recessed portion 22 adapted to receive a filter 20. A filter holder assembly 24 is secured by bolts, or screws or other suitable means, not shown, to the top plate 21 so that it overlies the recessed portion 22. It will be appreciated that the underside of the filter holder assembly 24 provides a top surface for the recessed portion 22 resulting in a cavity 25 (FIG. 3) into which the filter 20 is inserted. A flexible conduit 26 is provided with sealing means 27 including, for example, an O-ring 28 which, by means of threaded connector 29, may be brought down into air-tight sealing relationship with the plastic portion of the filter 20 surrounding the filter medium 12. In the detector position of the top plate 21, a pump, not shown, may be connected to conduit 26 to evacuate the chamber containing the filter 20. The detector, not shown, is contained in a detector holder 30 secured to bottom plate 31. Bottom plate 31 is provided with a hole 32 which communicates the detector with the filter 12 and on upwards to the conduit 26. The detector may be a radiation detector, such as a photodetector for detecting alpha radiation released from particulate contaminants collected by the filter 12 when in the measurement position.

To take samples of particulate contaminants, the top plate 21 is moved to the right as viewed in FIGS. 3 and 4 so that the filter is moved away from the detector to a position outside of housing 35 (FIG. 3). The top plate 21 is retained in the sampling position by a latch means (trigger) 36, the upturned end 37 of which passes through hole 39 in stationary bottom plate 31 and engages the left end of the movable upper plate 21. Spacers 40 secured to the upper plate 21 pass through slots 41 in the bottom plate 31 and guide longitudinal movement of the top plate 21. Lateral movement of the top plate 21 is restrained by guide brackets 50, 50 secured to the walls of the housing 35. A damper 51 (FIG. 3) may be attached to the movable upper plate 21 so that it will move smoothly from the sampling position to the measurement position.

Springs 54, 54 are attached to the bushings 40 and a stationary plate 55. When the movable plate is moved to the sampling position, the springs are extended, thus biasing the movable plate 21 towards the measurement position. The latch means 36, 37, retains the movable plate against the force of the springs 54, 54. At the end of a sampling period, the solenoid 53 is energized, causing the latch 36 to pivot in a counterclockwise direction, pulling its end 37 away from engagement with the left end of movable plate 21 so that the springs 54, 54 can then pull the plate 31 to the left, i.e. to the measurement position.

In FIG. 3, the solenoid trigger is shown displaced from its actual position, as indicated by the dashed line.

The arrangement shown in FIGS. 3 and 4 could be modified so that, instead of using springs and a releasable latch, a cam would move the movable plate 21 between the measurement and sampling positions, the cam being driven by a rotary stepping motor. Other means of moving the plate may occur to those skilled in the art.

What I claim as my invention is:

1. A filter for use in sampling devices for detecting particulate contaminants in a gaseous medium, comprising a base layer of opaque plastic material, said base layer having a hole of predetermined size; a filter membrane having a size slightly greater than said predetermined size and covering said hole; and a cover layer of plastic material covering said filter membrane and being adhered to said base layer, said cover layer having a hole of said predetermined size in registry with the hole in the base layer.

2. A filter as claimed in claim 1 wherein the plastic material of said cover layer is self-adhesive vinyl.

3. A filter as claimed in claim 1 or claim 2 wherein said base layer is 0.010 to 0.25 mm thick and said cover layer has a thickness of the order of 0.1 mm.

* * * * *